United States Patent
Kawasumi

(10) Patent No.: US 9,724,760 B2
(45) Date of Patent: Aug. 8, 2017

(54) MACHINE TOOL PROVIDED WITH TOOL POST

(71) Applicant: STAR MICRONICS CO., LTD., Shizuoka (JP)

(72) Inventor: Masahiro Kawasumi, Shizuoka (JP)

(73) Assignee: STAR MICRONICS CO., LTD., Shizuoka-Shi (JP)

( * ) Notice: Subject to any disclaimer, the term of this patent is extended or adjusted under 35 U.S.C. 154(b) by 0 days.

(21) Appl. No.: 15/345,664

(22) Filed: Nov. 8, 2016

(65) Prior Publication Data

US 2017/0072473 A1    Mar. 16, 2017

Related U.S. Application Data

(63) Continuation of application No. PCT/JP2015/052285, filed on Jan. 28, 2015.

(30) Foreign Application Priority Data

Aug. 7, 2014    (JP) ................................. 2014-160934

(51) Int. Cl.
*B23B 3/00*    (2006.01)
*B23B 3/16*    (2006.01)
(Continued)

(52) U.S. Cl.
CPC .............. *B23B 3/167* (2013.01); *B23B 3/065* (2013.01); *B23B 29/26* (2013.01); *B23Q 15/013* (2013.01)

(58) Field of Classification Search
CPC .......... B23B 3/065; B23B 3/165; B23B 3/167; B23B 3/168; B23B 3/164; B23B 3/162; B23B 3/16; B23B 29/32; B23Q 15/013
See application file for complete search history.

(56) References Cited

U.S. PATENT DOCUMENTS 3,725,987 A * 4/1973 Kurimoto ............... B23B 3/164
                                                    29/27 C
3,786,539 A * 1/1974 Foll ........................ B23B 3/161
                                                    29/27 R
(Continued)

FOREIGN PATENT DOCUMENTS

JP            08-39303         2/1996
JP          2003-080401        3/2003
(Continued)

*Primary Examiner* — Will Fridie, Jr.
(74) *Attorney, Agent, or Firm* — Lex IP Meister, PLLC

(57) ABSTRACT

A machine tool comprises a main spindle, a tool post body provided with a first tool mounting part and a second tool mounting part facing each other with a workpiece inbetween in a predetermined facing direction, and a tool post body driving unit for moving the tool post body in at least the facing direction. The tool post body comprises a first tool post unit provided with the first tool mounting part, a second tool post unit provided with a portion of the second tool mounting part with a relative interval with respect to the first tool post unit in the facing direction kept constant, a third tool post unit provided with the remaining portion of the second tool mounting part with a relative interval kept variable; and a relatively-driving unit for moving the third tool post unit in the facing direction with respect to the first tool post unit.

12 Claims, 8 Drawing Sheets

(51) Int. Cl.
  *B23B 29/26*  (2006.01)
  *B23Q 15/013*  (2006.01)
  *B23B 3/06*  (2006.01)

(56) References Cited

U.S. PATENT DOCUMENTS

| | | | | |
|---|---|---|---|---|
| 4,006,518 | A * | 2/1977 | Rudolph | B23B 3/161 29/27 R |
| 4,308,771 | A * | 1/1982 | Windle | B23B 3/161 29/52 |
| 4,827,814 | A * | 5/1989 | Wilkins | B23B 3/161 82/1.11 |
| 5,127,140 | A * | 7/1992 | Oiwa | B23B 3/167 29/27 C |
| 5,367,754 | A * | 11/1994 | Sheehan | B23B 3/161 29/27 C |
| 2008/0110307 | A1 | 5/2008 | Kong | |
| 2015/0306673 | A1* | 10/2015 | Akai | B23B 3/02 82/159 |

FOREIGN PATENT DOCUMENTS

| | | |
|---|---|---|
| JP | 2005-088142 | 4/2005 |
| JP | 2014-037043 | 2/2014 |

\* cited by examiner

MACHINE TOOL PROVIDED WITH TOOL POST

CROSS-REFERENCE TO RELATED APPLICATION

This application is a continuation of International Patent Application No. PCT/JP2015/052285, filed on Jan. 28, 2015, which claimed priority of Japanese Patent Application No. 2014-160934 filed on Aug. 7, 2014. The contents of these applications are incorporated herein by reference in their entirety.

BACKGROUND (a) Field

The present invention relates to a machine tool provided with a tool post.

(b) Description of the Related Art

A CNC (Computerized Numerical Control) lathe provided with a guide bush holding a long workpiece gripped by a main spindle and provided with a pair of gang tool posts facing each other with the workpiece inbetween is conventionally known as a machine tool. Japanese Patent Application Publication No. 2005-88142 shows a lathe provided with a moving bed movable in a Y-direction perpendicular to an workpiece axial direction with respect to a supporting frame, a first tool post on which a plurality of tools are attached in the form of a comb in the Y-direction, and a second tool post on which a plurality of tools are attached in the form of a comb in the Y-direction. The first tool post is opposite the second tool post with the guide bush inbetween. The first tool post and the second tool post are independently movable in the workpiece axial direction and an X-direction perpendicular to the Y-direction. The moving bed is provided with first moving means for reciprocally moving the first tool post in the X-direction and second moving means for reciprocally moving the second tool post in the X-direction.

Simultaneous machining is enabled when the first moving means moves the first tool post in the X-direction toward the workpiece while the second moving means moves the second tool post in the X-direction toward the workpiece.

SUMMARY

When the first tool post is moved toward the workpiece in the X-direction, all the tools attached to the first tool post are moved toward the workpiece. When the second tool post is moved toward the workpiece in the X-direction, all the tools attached to the second tool post are moved toward the workpiece. Since the first tool post is moved independently of the second tool post in the X-direction, the tools need be arranged to avoid interference with each other when the tool posts are brought closest to each other, restricting tool arrangement freedom.

Such problem resides not only in a lathe provided with a gang tool post but also in a lathe provided with a turret or another tool post and further a machine tool of another type.

The purpose of the present invention is to improve tool arrangement freedom in a machine tool capable of simultaneous machining.

A machine tool of the invention comprises a main spindle movable in a predetermined direction with a workpiece gripped thereby, a tool post body provided with a first tool mounting part and a second tool mounting part facing each other with the workpiece inbetween in a predetermined facing direction different from the predetermined direction and configured to be movable in at least the facing direction, and a tool post body driving unit configured to move the tool post body in at least the facing direction. The tool post body comprises a first tool post unit provided with the first tool mounting part, a second tool post unit provided with a portion of the second tool mounting part with a relative interval with respect to the first tool post unit in the facing direction kept constant, a third tool post unit provided with the remaining portion of the second tool mounting part with a relative interval with respect to the first tool post unit in the facing direction kept variable, and a relatively-driving unit configured to relatively move the third tool post unit in the facing direction with respect to the first tool post unit.

The invention of claim 1 improves tool arrangement freedom in a machine tool capable of simultaneous machining. The invention of claim 2 provides a preferred example of improved tool arrangement freedom. The invention of claim 3 further improves tool arrangement freedom. The invention of claim 4 suppresses an increase in external size of the machine. The invention of claim 5 facilitates simultaneous machining.

DETAILED DESCRIPTION

Figure 1:
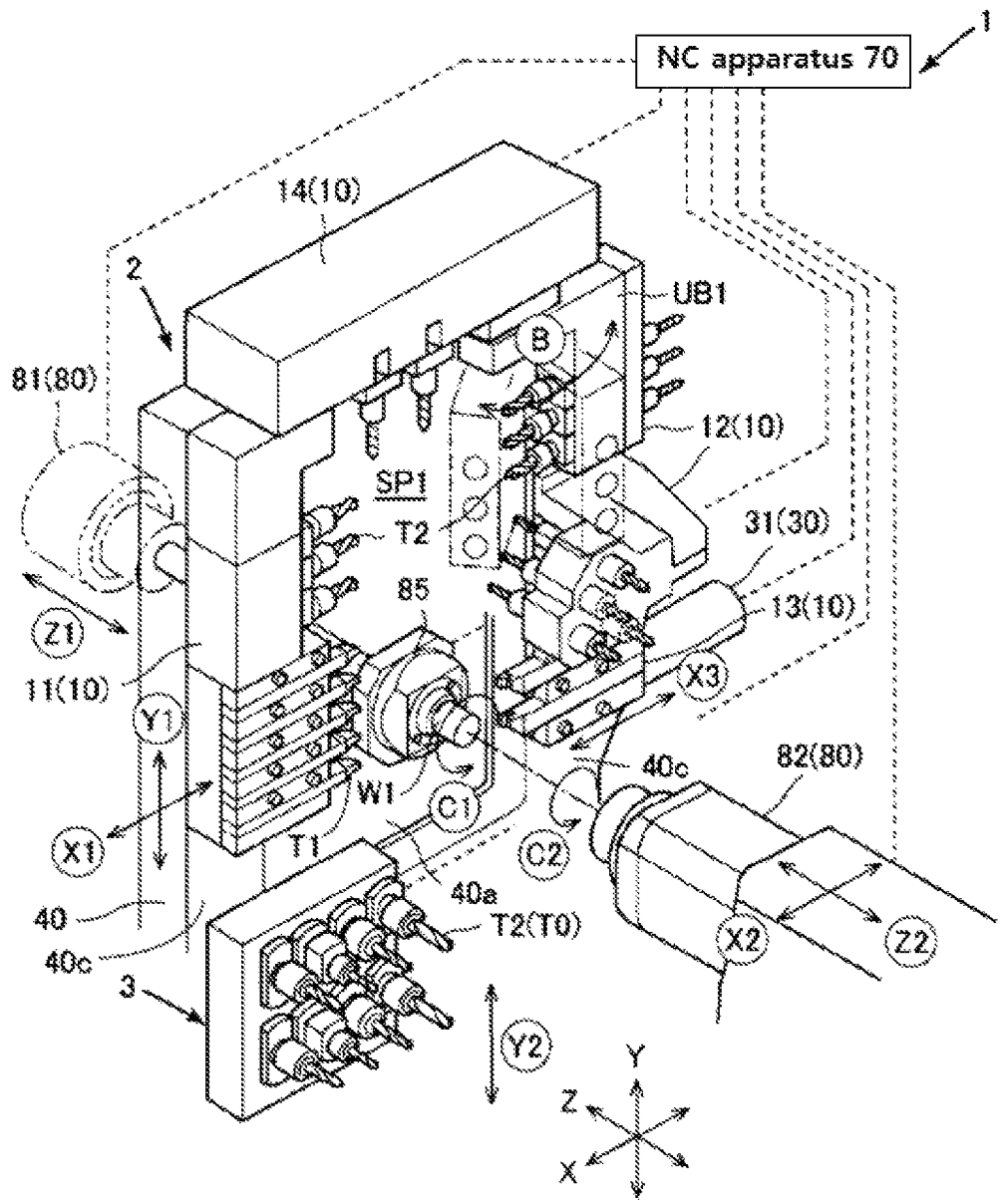
FIG. 1 is a perspective view of an example of a schematically shown machine tool

The embodiment of the invention is being described. The embodiment is only an example of the invention. The described elements are not necessarily essential to the solution of the invention.

(1) Summary of Technology Included in the Present Invention

A summary of technology included in the present invention is being described referring to FIG. 1 to FIG. 7C where an NC (Numecial Control) lathe is shown as an example of a machine tool 1. There may be a mismatch in the figures which are only schematically drawn.

The machine tool 1 includes a main spindle 80 movable in a predetermined direction (Z-direction) with a workpiece W1 gripped thereby, a tool post body 10, and a tool post body driving unit 50. The tool post body 10 is provided with a first and second tool mounting parts 21 and 22 opposite each other with the workpiece W1 inbetween in a predetermined facing direction of the first and second tool mounting parts 21 and 22 (X-direction) different from the Z-direction. The tool post body 10 is movable in at least the facing direction (X-direction). The tool post body driving unit 50 drives the tool post body 10 in at least the X-direction. The tool post body 10 includes a first tool post unit 11, a second tool post unit 12, a third tool post unit 13, and a relatively-driving unit 30. The first tool post unit 11 is provided with the first tool mounting part 21. The second tool post unit 12 is provided with a portion of the second tool mounting part 22 with a relative interval L1 with respect to the first tool post unit 11 kept constant in the facing direction (X-direction). The third tool post unit 13 is provided with the remaining portion of the second tool mounting part 22 with a relative interval L2 with regard to the first tool unit 11 kept variable in the facing direction (X-direction). The relatively-driving unit 30 relatively drives the third tool post unit 13 in the facing direction (X-direction) with respect to the first tool post unit 11.

Figure 8:
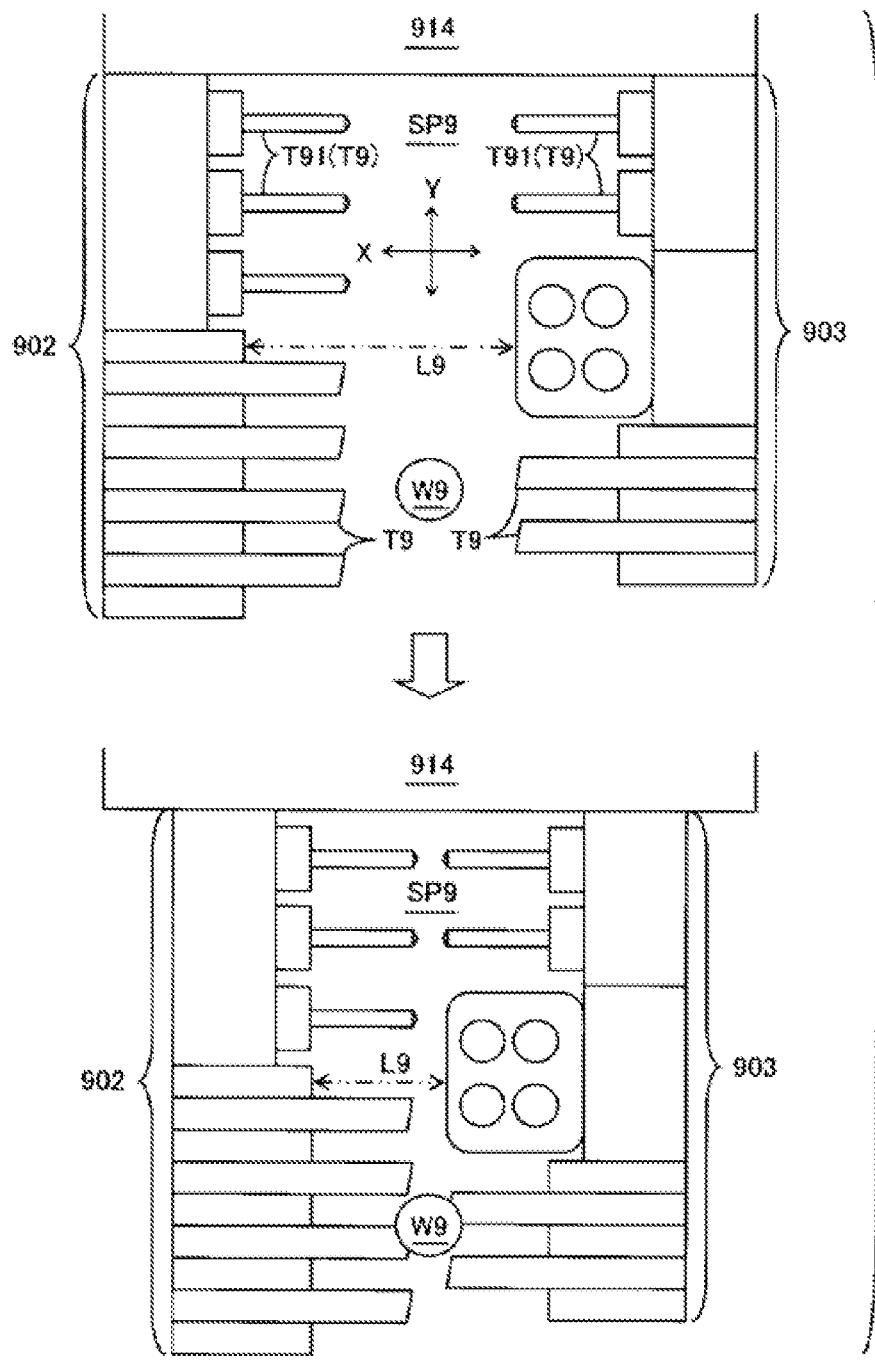
FIG. 8 is a drawing schematically showing a manner in that a pair of opposite gang tool posts are independently movable in the X-direction in a comparative example.

FIG. 8 schematically shows a comparative example in that opposite gang tool posts 902 and 903 are independently movable in the X-direction. The gang tool posts 902 and 903 each have a plurality of tools T9 arranged in a Y-direction. The gang tool posts 902 and 903 are independently driven in the X-direction toward a workpiece W9 supported by a guide bush or a main spindle for simultaneous machining. An interval L9 is reduced between portions of the gang tool posts 902 and 903 where tools T91, which are not used for simultaneous machining, are attached. A space SP9 for the tools T91 is thereby reduced. All the tools T9 need be arranged to avoid interference even when they are brought closest to each other, which restricts tool arrangement freedom. Especially, a base unit 914 connecting the ends of the gang tool post 902 and 903 cannot have any tools mounted on the side facing the gang tool posts 902 and 903.

Figure 2:
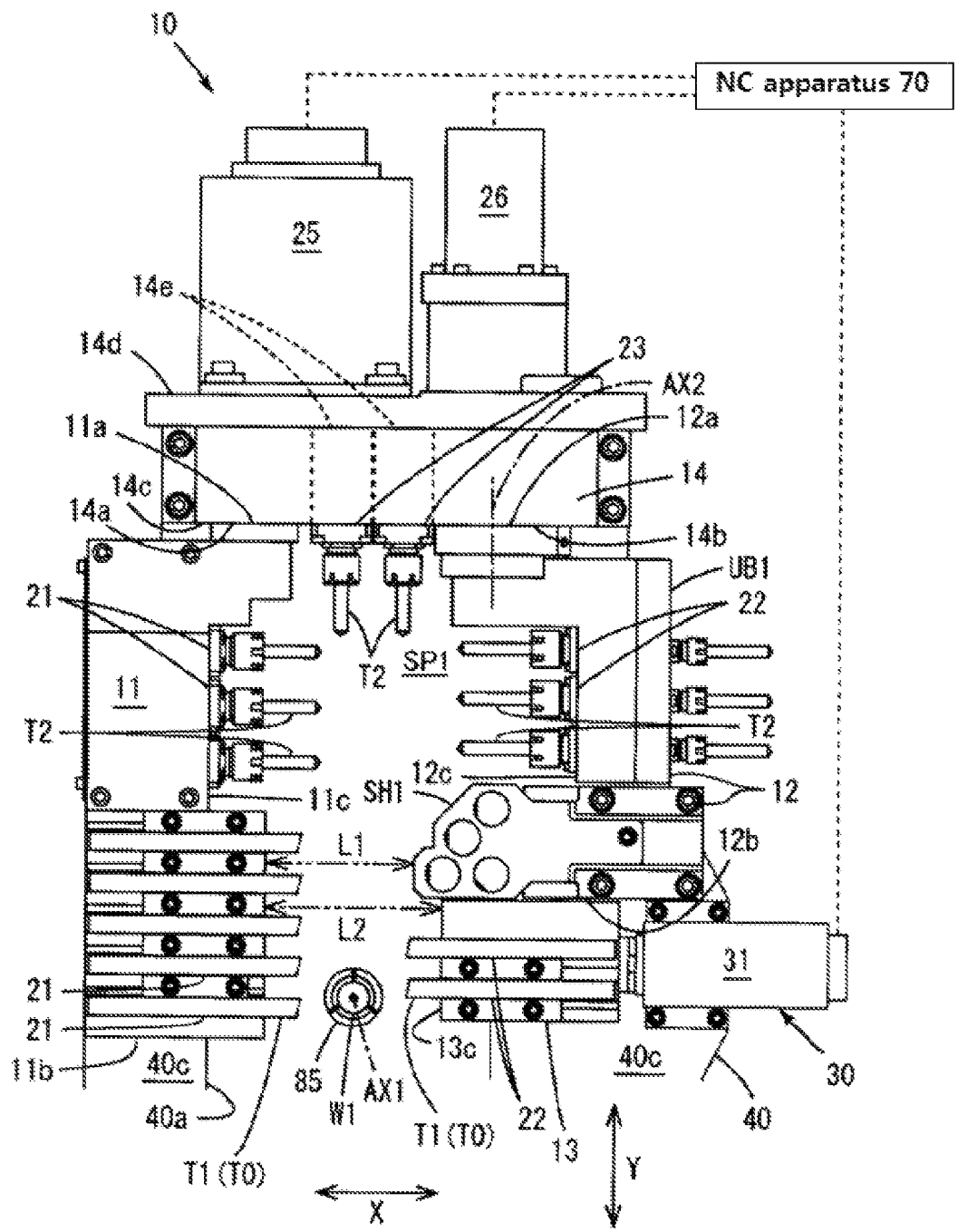
FIG. 2 is a drawing schematically showing an appearance of a tool post along with an NC apparatus.
Figure 6:
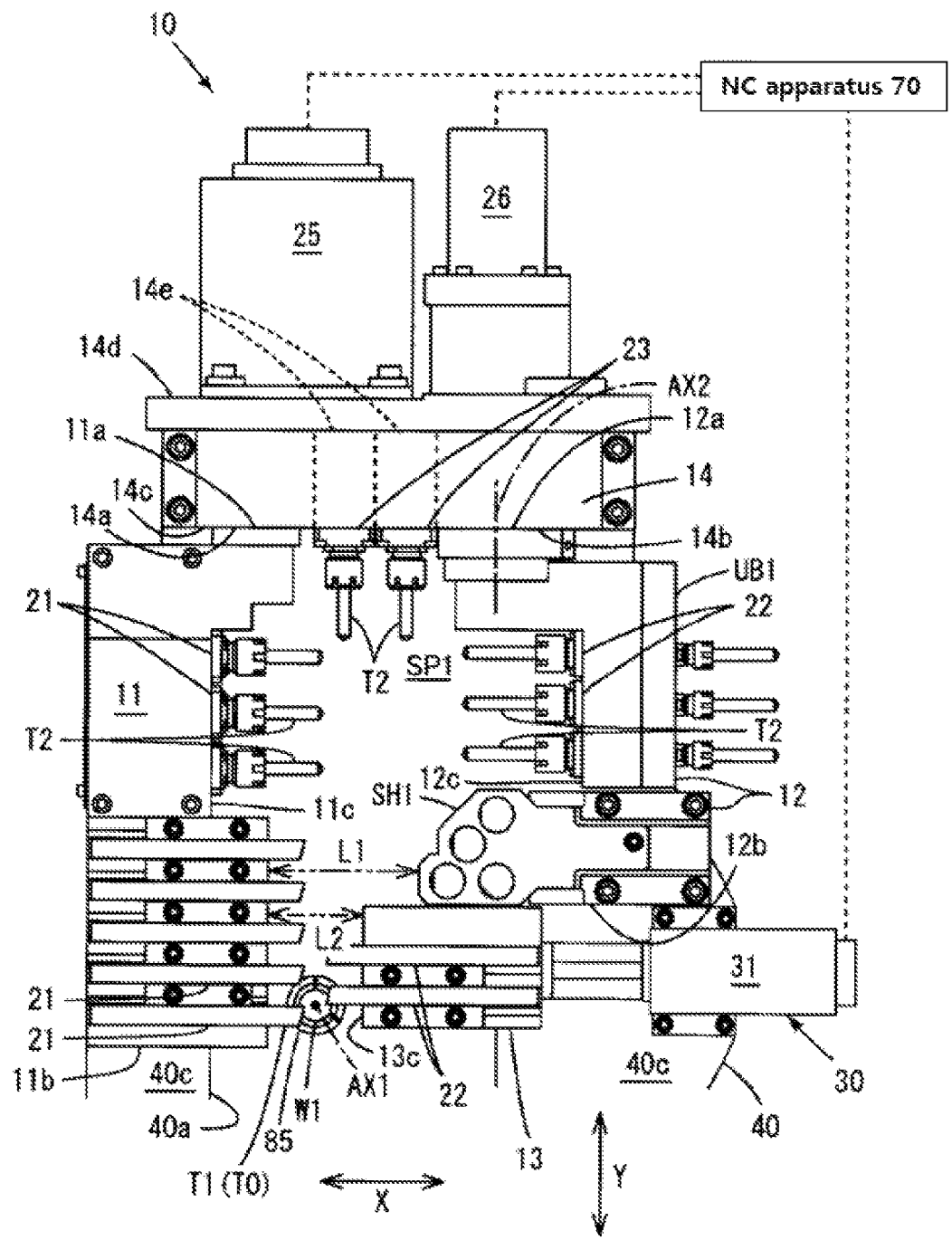
FIG. 6 is a drawing schematically showing an example of operation of the tool post.

In the present invention as shown in FIG. 2, FIG. 6 and others where the first tool post unit 11 faces the second tool post unit 12 and the third tool post unit 13, the interval L2 between the third tool post unit 13 and the first tool post unit 11 is variable in the facing direction (X-direction), thereby enabling simultaneous machining such as simultaneous turning, simultaneous drilling, and simultaneous milling. The interval L1 between the second tool post unit 12 and the first tool post unit 11 is kept constant in the facing direction (X-direction). A space SP1 between tools T0 of the tool post units 11 and 12 are thereby kept constant, enhancing tool arrangement freedom between the tool post units 11 and 12. Accordingly, the invention improves tool arrangement freedom in a machine tool capable of simultaneous machining.

The first and second tool mounting parts 21 and 22 includes a portion where the tool T0 has been attached and a portion available to another tool T0. The tool post body 10 may be movable only in the facing direction (X-direction) or in a different direction from the facing direction (X-direction) including the Y-direction. The facing direction may be the Y-direction and others. The relative interval between the tools attached to the tool post units corresponds to the relative interval L1 or L2 of the tool post units. The relative interval L1 or L2 of the tool post units includes the relative interval of the tools attached to the tool post units. In the case the tool post unit 11, 12, or 13 have a rotatable unit (a rotating unit UB1, for example), the relative interval of the tool post units may be the interval of fixed units if any. Absent a fixed unit, the relative interval is based on a predetermined rotating angle of the rotating unit where the first tool mounting part 21 faces the second tool mounting part 22.

The first tool mounting part 21 may be a portion where the tools T0 are arranged in the tool arrangement direction (Y-direction) which is different from the facing direction (X-direction). The second tool mounting part 22 may be a portion where the tools T0 are arranged in the tool arrangement direction (Y-direction). The tool post body 10 may be provided with a base unit 14 connecting a Y-direction end 11a of the first tool post unit 11 and a Y-direction end 12a of the second tool post unit 12. The third tool post unit 13 may be separated from the base unit 14 in the tool arrangement direction (Y-direction) with the second tool post unit 12 inbetween. In this embodiment, the interval L1 between the second tool post unit 12 and the first tool post unit 11 is kept constant in the facing direction (X-direction), tool arrangement freedom is thereby improved for the tools T0 attached to the tool post units near the base unit 14. The tool arrangement direction may be any direction but the facing direction.

The base unit 14 may be provided with a third tool mounting part 23 on an inner surface 14c thereof on the side where the first tool post unit 11 and the second tool post unit 12 are provided. The interval L1 between the second tool post unit 12 and the first tool post unit 11 near the base unit 24 is kept constant, allowing many tools T0 to be attached to the base unit 14. Such configuration would further improve tool arrangement freedom. The third tool mounting part 23 includes a portion where the tool T0 has been attached and a portion available to another tool T0

Figure 5:
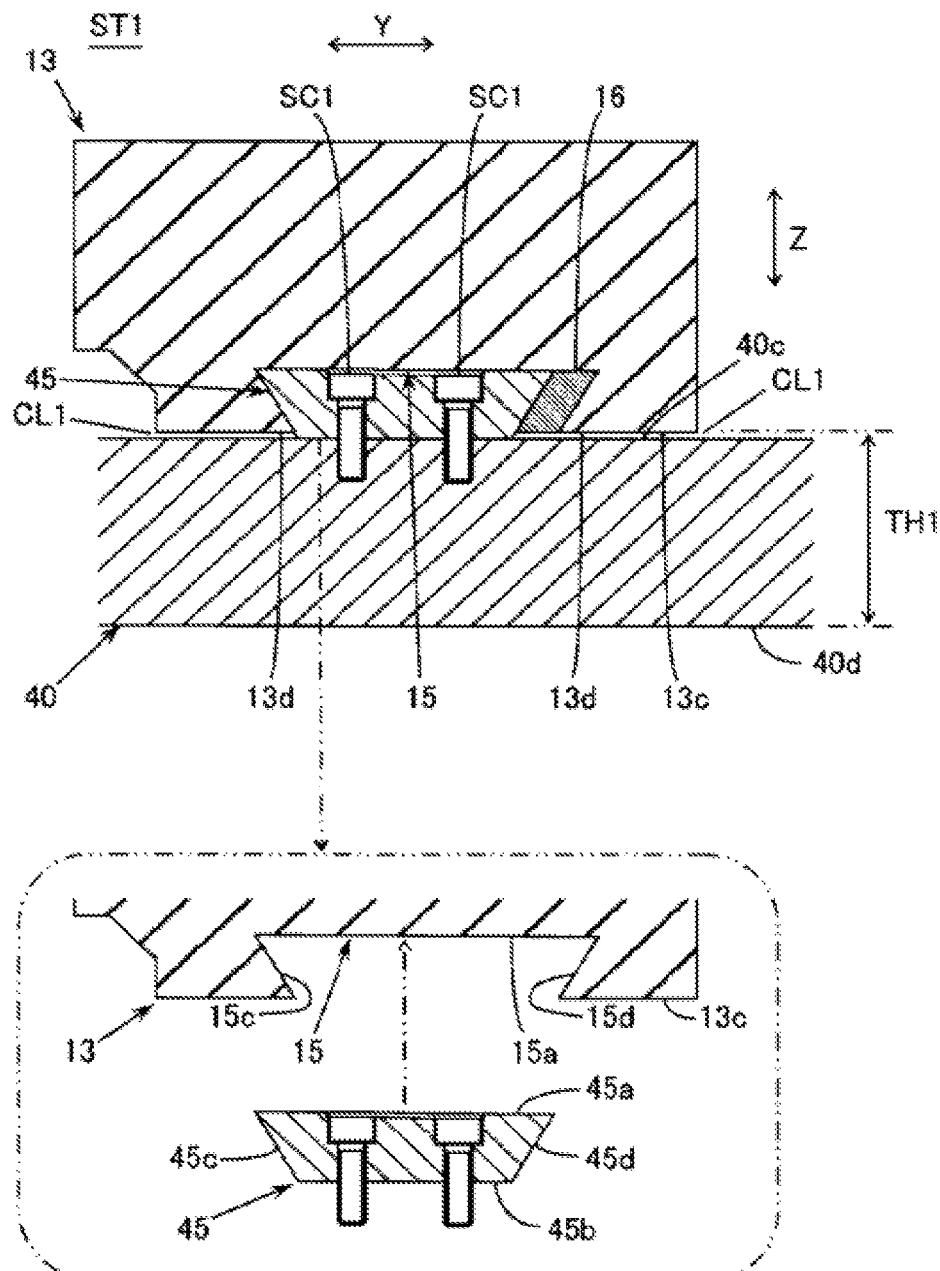
FIG. 5 is a sectional view of the engagement structure using the dovetail and the dovetail groove.

The tool post body 10 may be provided on a tool post table (supporting unit) 40 movable in at least the facing direction (X-direction). As shown in FIG. 5, the tool post table 40 may be securely provided with a dovetail 45 having a trapezoid cross sectional shape widened as far from the tool post table 40 with its longitudinal direction oriented along the facing direction (X-direction). A dovetail groove 15 to which the dovetail 45 is to be inserted may be formed on a facing surface 13c of the third tool post unit (moving unit) 13 with respect to the tool post table 40. The facing surface 13c may be a non-contact surface on a periphery 13d of the dovetail groove 15.

Figure 9:
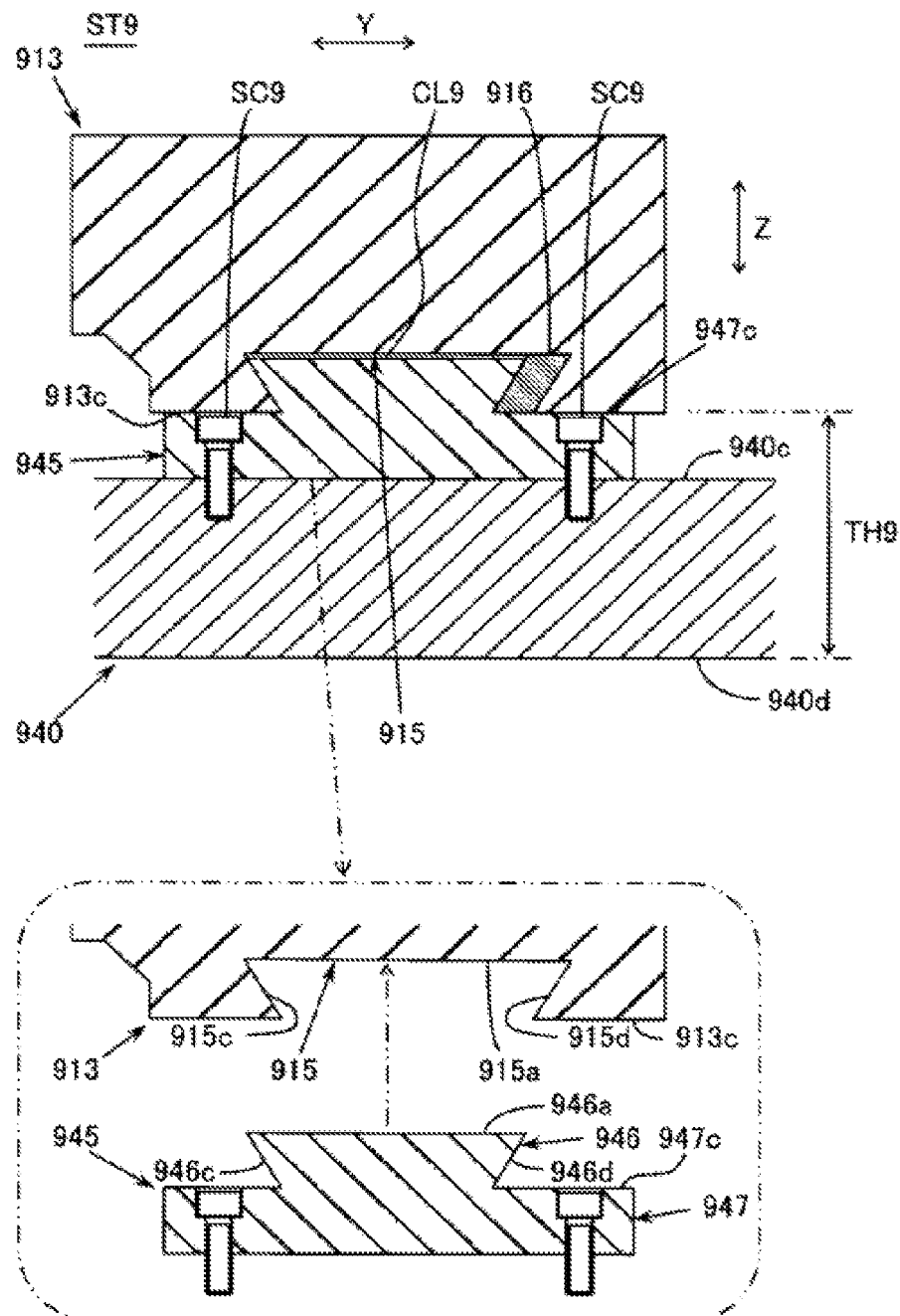
FIG. 9 is a sectional view of an engagement structure using a dovetail and a dovetail groove in the comparative example.

FIG. 9 shows an engagement structure ST9 for slidably driving a moving unit 913 in the X-direction with respect to a supporting unit 940 in the machine tool of the comparative example. The supporting unit 940 is provided with a dovetail forming member 945 having a dovetail 946 of a trapezoid cross sectional shape. The dovetail forming member 945 is widened as far from the supporting unit 940 with its longitudinal direction oriented along the X-direction. A dovetail groove 915 to which the dovetail 946 is to be inserted is formed on a facing surface 913c of the moving unit 913 with respect to the supporting unit 940. A long gib 916 is inserted in the dovetail groove 915 to adjust the gap with respect to the dovetail 946.

The dovetail 946 is required to be ground by an engineer to secure positional accuracy of the moving unit 913. If the supporting unit 940 is so big as to surround the guide bush as in the tool post table 40 shown in FIG. 1, the dovetail 946 protruded from a facing surface 940c of the supporting member 940 with respect to the moving unit 913 could not be ground to secure required machining accuracy. As shown in FIG. 9, the dovetail forming member 945 has the dovetail 946 formed on a fitting part 947 to be mounted on the facing surface 940c of the supporting member 940 by a screw SC9. When the dovetail 946 is inserted into the dovetail groove 915, a facing surface 947c of the fitting part 947 is brought into contact with the facing surface 913c of the moving unit 913, a slope 946c of the dovetail 946 is brought into contact with a slope 915c of the dovetail groove 915, a slope 946d of the dovetail 946 is brought into contact with a gib 916, and the gib 916 is brought into contact with a slope 915d of the dovetail groove 915. The contact surfaces as above described are subject to load. A clearance CL9 is provided between a top 946a of the dovetail 946 and a bottom 915a of the dovetail groove 915 for high accuracy sliding movement. The top 946a of the dovetail 946 and the bottom 915a of the dovetail groove 915 are non-contact surfaces.

In the case the supporting unit 940 is configured to surround the guide bush just like the tool post table 40 is, thickness TH9 between a back surface 940d of the supporting unit 940 and the facing surface 913c of the moving unit 913 is increased. Increased thickness increases the distance between the main spindle supplying the workpiece W9 and the guide bush. The longer the distance is, the longer an uncut portion of the workpiece W9 remains and the greater a load on the workpiece W9 is. The supporting unit 940 needs a certain thickness to secure strength for supporting the tool post body.

In the invention, however, absent the fitting part 947, the facing surface 13c of the third tool post unit 13 with respect to the tool post table 40 is not brought into contact with the dovetail 45 on the periphery 13d of the dovetail groove 15. As shown in FIG. 5, the clearance CL1 is provided on the periphery 13d of the dovetail groove 15 between the facing surface 13c of the third tool post unit and the facing surface 40c of the tool post table 40. Such configuration reduces thickness TH1 in the direction perpendicular to the facing surface 13c (Z-direction) between a back surface 40d of the tool post table 40 and the facing surface 13c of the third tool post unit 13 by almost thickness of the fitting part 647. The embodiment suppresses increasing in size of the machine tool and further lessens waste of an uncut portion of the long workpiece supplied in the thickness direction of the dovetail.

Figure 7A:
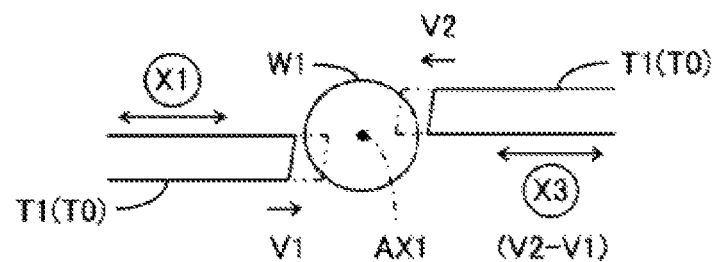
FIG. 7A, FIG. 7B, and FIG. 7C are drawings schematically showing an example of simultaneous machining.
Figure 7B:
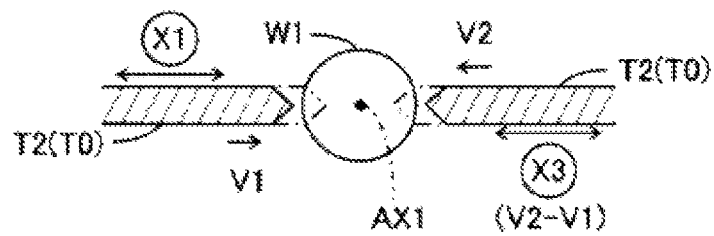

The machine tool 1 may be provided with a control unit (NC apparatus) 70 to control the tool post body driving unit 50 and the relatively-driving unit 30. For simultaneous movement of the first tool post unit 11 at a velocity V1 and the third tool post unit 13 at a velocity V2 in the facing direction (X-direction), as shown in FIG. 7A and FIG. 7B, the NC apparatus 70 may control the tool post body driving unit 50 to move the first tool post unit 11 at the velocity V1 in the facing direction (X-direction) while the relatively-driving unit 30 to move the third tool post unit 13 at the velocity V2−V1 in the facing direction (X-direction). The embodiment enables easy simultaneous machining since the velocity V1 of the first tool post unit 11 is automatically cancelled when the third tool post unit 13 is moved at the velocity V2 in the facing direction (X-direction). The invention may be applied to a computer control program for implementing the function of the control unit 70, a computer-readable medium storing the computer control program, and a control method comprising a process corresponding to the function of the control unit 70.

The invention relates to an engagement structure ST1 of the machine tool allowing the moving unit (the third tool post unit 13 for example) to be slidable with respect to the supporting unit (the tool post table 40 for example) in the guiding direction (X-direction), wherein the supporting unit 40 is securely provided with the dovetail 45 having a trapezoid cross sectional shape widened as far from the supporting unit 40 with its longitudinal direction oriented along the guiding direction (X-direction), and the dovetail groove 15 to which the dovetail 45 is to be inserted is formed on the facing surface 13c of the moving unit 13 with respect to the supporting unit 40, and the facing surface 13c is a non-contact surface on the periphery 13d of the dovetail groove 15.

As described referring to FIG. 5, the engagement structure ST1 includes a non-contact structure in which the facing surface 13c of the moving unit 13 with respect to the supporting unit 40 is not in contact with the dovetail 45 on the periphery 13d of the dovetail groove 15. The thickness TH1 in the direction perpendicular to the facing surface 13c (Z-direction) from the back surface 40d of the supporting unit 40 to the facing surface 13c of the moving unit 13 can be reduced by almost the thickness of the fitting part 947 (FIG. 9). The invention therefore reduces the engagement structure in size and suppresses an increase in size of the machine tool. The moving unit may be a moving unit to be used to machine the workpiece such as the third tool post unit.

(2) Embodiment of the Structure of the Machine Tool

Figure 3:
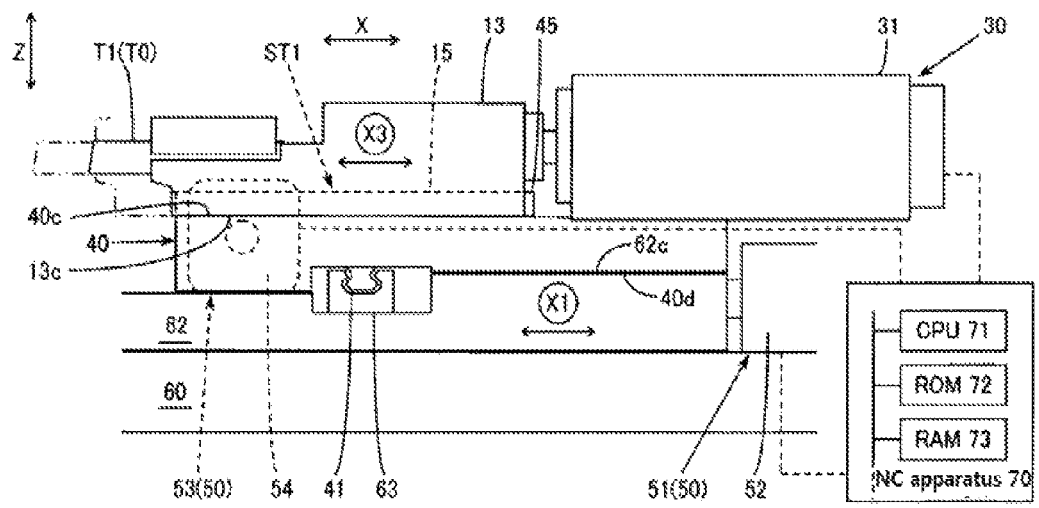
FIG. 3 is a drawing schematically showing a part of the tool post along with the NC apparatus.

FIG. 1 schematically shows the NC lathe 1 of the embodiment of the machine tool of the invention. FIG. 2 schematically shows the appearance of the tool post body 10 and the NC apparatus 70. FIG. 3 schematically shows a part of the tool post 2 and the NC apparatus 70. The NC lathe 1 includes the main spindle 80 (a front spindle 81 and a back spindle 82), a guide bush 85, a plurality of tool posts 2 and 3, and the NC apparatus 70. A motor used in the embodiment is a numerically controllable servomotor. The main spindle 80, the guide bush 85, the tool posts 2 and 3, and some of the tool T0 may be made of metal, for example.

The front spindle 81 releasably grips the cylindrical (bar) workpiece W1 inserted in a Z1-axis direction and rotates the workpiece W1 around a C1-axis or on an AX1-axis along the longitudinal direction of the workpiece W1. The front spindle 81 is supported on a not-shown headstock so as to be movable in the Z1-axis direction (its own axis direction). The guide bush 85 slidably supporting the workpiece W1 inserted through the front spindle 81 in the Z1-axis direction is rotatably driven around the C1-axis in synchronization with the front spindle 81. The back spindle 82 releasably grips the front-machined workpiece W1 inserted in a Z2-axis direction and rotates the workpiece W1 around a C2-axis or on the AX-axis of the front spindle 81. The back spindle 82 is supported on a not-shown bed so as to be movable in the Z2-axis direction (its own axis direction) and an X2-axis direction.

The tool post 2 shown in FIG. 1 is a gang tool post having the tool post body 10 mounted on a gang tool post table 40 in a manner that a plurality of tools T0 are arranged like a comb. The gang tool post is functional and cost-effective in that many tools are available. The technology of this invention is capable of simultaneous machining in such advantageous gang tool post. The tool T0 attached to the tool post 2 includes a stationary tool T1 such as a turning tool unrotatably fixed and a rotary tool T2 such as a power driven drill. The tool may be detachably attached to the tool post body 10 in the form of a tool unit. The tool post body 10 is available for both front and back machining and movable in an X1 direction and a Y1 direction. In this embodiment, the tool post body 10 may be provided with the third tool post unit 13 movable in an X3-axis direction. The back-working tool post 3 shown in FIG. 1 is a tool post for back-machining the workpiece W and have a plurality of rotary tools T2 arranged in a direction perpendicular to the Z2-axis direction and a Y2-axis direction. The back-working tool post 3 is movable in the Y2-axis direction.

The X1-axis, X2-axis, or X3-axis is a position control axis in the X-direction. The Y1-axis or Y2-axis is a position control axis in the Y-direction. The Z1-axis or Z2-axis is a position control axis in the Z-direction. The C1-axis or C2-axis is a rotary position control axis around the virtual axis in the Z-direction. The X1-axis, X2-axis, and X3-axis are in the same X-direction. The Y1-axis and Y2-axis are in the same Y-direction. The Z1-axis and Z2-axis are in the same Z-direction. The X-direction, the Y-direction, and the Z-direction respectively are different directions and desirably substantially perpendicular to each other for easier movement control, but may be shifted within 45 (forty-five) degrees from the perpendicular direction.

The NC apparatus (control unit) 70 controls each part of the NC lathe 1 including the main spindle 80, the guide bush 85, and the tool posts 2 and 3. The NC apparatus 70 shown in FIG. 3 is a computer including a CPU (Central Processing Unit) 71 with a semiconductor memory comprising a ROM (Read Only Memory) 72 and a RAM (Random Access Memory) 73, a not shown timer, a not shown interface (I/F) and others connected thereto. The ROM 72 stores an interpretive program for the computer to interpret and execute a plurality of commands in a user-written NC (numerical control) program stored in the RAM 73. The NC apparatus 70 accepts an operation via an input of a not-shown panel and displays various information related to the NC lathe 1 on an output of the panel.

The tool post body 10 includes the base unit 14, the first tool post unit 11, the second tool post unit 12, the third tool post unit 13, and the relatively-driving unit 30. The first tool mounting part 21 provided on the first tool post unit 11 faces the second tool mounting part 22 provided on the second tool post unit 12 and the third tool post unit 13 with the workpiece W1 inbetween in the X-direction (facing direction). The tool post body 10 on the tool post table 40 movable in the X1-direction and the Y1-direction is driven by the tool post body driving unit 50 in the X1-direction and the Y1-direction.

The base unit 14 is fastened to the tool post table 40 by a screw with its longitudinal direction oriented along the X-direction, connecting the Y-direction end 11a of the first tool post unit 11 and the Y-direction end 12a of the second tool post unit 12. The base unit 14 is provided with the third tool mounting part 23 on the inner surface 14c thereof on the side where the first tool post unit 11 and the second tool post unit 12 are provided. The third tool mounting part 23 allows a plurality of tools T0 to be attached in the X-direction. The inner surface 14c is provided with a plurality of tool unit fitting part 14e, as shown in FIG. 2, for detachably attaching a tool unit of the tool T0. The tool unit includes a rotary tool unit of the rotary tool T2, a thread whirling unit, a slotting unit, and a polygon machining unit. The plurality of tool unit fitting parts may be provided with a single tool unit. The inner surface 14c of the base unit 14 is further provided with connecting parts 14a and 14b for the tool post units 11 and 12 respectively outside the tool unit fitting part 14e in the X-direction.

As shown in FIG. 2, a rotary tool driving motor 25 for the rotary tool T2 and a rotating unit driving motor 26 for the rotating unit UB1 attached to the second tool post unit 14 are fastened to an outside surface 14d of the base unit 14 by a screw. A first power transmission mechanism (not shown) is provided on the base unit 14 and the first tool post unit 11 to transmit rotation driving power from the motor 25 to the rotary tool T2 attached to the first tool mounting part 21. A second power transmission mechanism (not shown) is provided on the base unit 14 and the second tool post unit 12 to transmit rotation driving power from the motor 25 to the rotary tool T2 attached to the second tool mounting part 22. A third power transmission mechanism (not shown) is provided on the base unit 14 to transmit rotation driving power from the motor 25 to the rotary tool T2 attached to the third tool mounting part 23. A fourth power transmission mechanism (not shown) is provided on the base unit 14 to transmit rotating power from the motor 26 to the rotating unit UB1. The rotary tool driving motor 25 thereby drives the rotary tool T2 attached to the tool mounting part 21, 22 or 23. The rotating unit driving motor 26 thereby rotates the rotating unit UB1 on a rotating axis AX2 along the Y-direction. The control axis of the rotating unit UB1 is shown as a B-axis in FIG. 1. A sleeve holder SH1 does not rotate. The third tool post unit 13 does not rotate.

The first tool post unit 11 is fastened to the tool post table 40 by a screw with the protruding direction from the connecting part 14a of the base unit 14 substantially oriented in the Y-direction as shown in FIG. 2. The first tool mounting part 21 having the tool T0 arranged in the Y-direction is provided on a facing surface 11c of the first tool post unit 11 with respect to the second and third tool post units 12 and 13. In FIG. 2, the first tool mounting part 21 have a plurality of rotary tools T2 on the side of the Y-direction end 11a of the first tool post unit 11 while a plurality of stationary tools T1 on the side of the Y-direction end 11b thereof. The first tool mounting part 21 may have a plurality of stationary tools T1 on the side of the Y-direction end 11a of the first tool post unit 11 while a plurality of rotary tools T2 on the side of the Y-direction end 11b thereof. Various combinations of tools are available on the first tool mounting part 21. There is no other tool post unit beyond the Y-direction end 11b of the first tool post unit 11 in the protruding direction from the connecting part 14. When the workpiece W1 is simultaneously machined by the tool T0 of the tool post units 11 and 13, protrusion of the tool post unit 13 beyond the tool post table 40 is preferably restricted to a small amount. The tool T0 attached to the first tool post unit 11 is preferably positioned in the X-direction nearest to the tool T0 attached to the third tool post unit 13.

The second tool post unit 12 is fastened to the tool post table 40 by a screw with the protruding direction from the connecting part 14b of the base unit 14 substantially oriented in the Y-direction as shown in FIG. 2. A portion of the second tool mounting part 22 having the tool T0 arranged in the Y-direction is provided on a facing surface 12c of the second tool post unit 12 with respect to the first tool post units 11. The second tool post unit 12 is provided with the rotating unit UB1 at the side of the Y-direction end 12a thereof and the sleeve holder SH1 at the side of the Y-direction end 12b. A plurality of rotary tools T2 are attached to the rotating unit UB1. A plurality of tools may be attached to the sleeve holder SH1. The third tool post unit 13 is provided beyond the Y-direction end 12b of the second tool post unit 12 in the protruding direction from the connecting part 14b. As shown in FIG. 3, the third tool post unit 13 is movably provided with respect to the tool post table 40 in the X3-axis direction to be driven by the relatively-driving unit 30 in the X3-axis direction. As shown in FIG. 2, the third tool post unit 13 has the remaining portion of the second tool mounting part 22 having the tool T0 arranged in the Y-direction. A plurality of stationary tools are mounted on the third tool post unit 13 in FIG. 2. Various combinations of the tools are available on the tool mounting part 22. There is no other tool post unit beyond the third tool post unit 13 in the protruding direction from the connecting part 14*b*.

The first tool post unit 11 and the second tool post unit 12 are commonly provided on the tool post table 40 in an unmovable manner in the X-direction. The relative interval L1 therebetween in the X-direction is thereby kept constant. The third tool post unit 13 is movably provided on the tool post table 40 in the X-direction. The relative interval L2 with respect to the first tool post unit 11 is thereby variable.

Preferably, means for adjusting the position in the Y and Z directions of the tool T0 attached to the first and third tool post units 11 and 13 may be provided for precise simultaneous machining A shim, for example, may be inserted in a gap when the tool T0 is attached to adjust the position in the Y and Z directions.

As shown in FIG. 3, the relatively-driving unit 30 is provided with an X3-axis driving motor 31 and a rotation-linear movement transforming mechanism. The X3-axis driving motor 31 is fastened by a screw to a facing surface 40*c* of the tool post table 40 with respect to the third tool post unit 13. The third tool post unit 13 is reciprocally movable in the X3-axis direction along the facing surface 40*c* of the tool post table 40. The relatively-driving unit 30 drives the third tool post unit 13 with respect to the first tool post unit 11 under control of the NC apparatus 70.

The tool post table 40, as shown in FIG. 1, is provided with an opening 40*a* where the guide bush 85 is inserted. On the facing surface 40*c* thereof with respect to the tool post units 11, 12, and 13, the first and second tool post units 11 and 12 and the X3-axis driving motor 31 are mounted. The tool post table 40 is driven in the X1 and Y1-axis directions by the tool post body driving motor 50 shown in FIG. 3.

The tool post body driving motor 50 includes a base 60, a slide base 62 provided on the base 60 in a slidable manner in the X-direction, an X1-axis driving unit 51 for driving the slide base 62 in the X1-axis direction, and a Y1-axis driving unit 53 for driving the tool post table 40 slidably provided on the slide base 62 in the Y1-axis direction. A slide rail 41 is provided on the facing surface (back surface) 40*d* of the tool post table 40 with respect to the slide base 62 with the longitudinal direction oriented in the Y-direction. A Y-axis guide 63 is provided on a facing surface 62*c* of the slide base 62 with respect to the tool post table 40 in a slidable manner along the slide rail 41. The slide rail 41 and the Y-axis guide are exchangeable. The Y1-axis driving unit 53 is provided with a Y1-axis driving motor 54 and a rotation-linear movement transforming mechanism to reciprocally drive the tool post table 40 along with the tool post body 10 relatively in the Y1-axis direction with respect to the slide base 62. A slide rail and an X-axis guide (not shown) similar to the slide rail 42 and the Y-axis guide 63 are provided between the slide base 62 and the base 60. The X1-axis driving unit 51 is provided with an X1-axis driving motor 52 and a rotation-linear movement transforming mechanism to reciprocally drive the slide base 62 along with the tool post table 40 relatively in the X1-axis direction with respect to the base 60. The tool post body driving unit 50 thereby drives the tool post body 10 for movement in the X and Y directions.

The NC apparatus 70 controls the operation of the tool post body driving unit 50 in accordance with a plurality of commands in the NC program to numerically control the tool post body 10 movable in the X1-axis and Y1-axis directions. The NC apparatus 70 controls the operation of the relatively-driving unit 30 in accordance with a plurality of commands in the NC program to numerically control the third tool post unit 13 movable in the X3-axis direction The tool post table 40 is configured to surround the guide bush 85 as shown in FIG. 1. As the tool post table 40 is increased in thickness (or in length in the Z-axis direction) including the structure for driving the third tool post unit 13 in the X3-axis direction, the distance between the front spindle 81 and the guide bush 85 is accordingly increased, resulting in that a longer portion of the workpiece W1 remains uncut and a greater load is applied to the workpiece W1. The tool post table 40 needs thickness for strength except the portion of the third tool post unit driving structure. A special engagement structure ST1 as shown in FIG. 4 and FIG. 5 is therefore used to drive the third tool post unit 13 in the X3-axis direction with respect to the tool post table 40.

Figure 4:
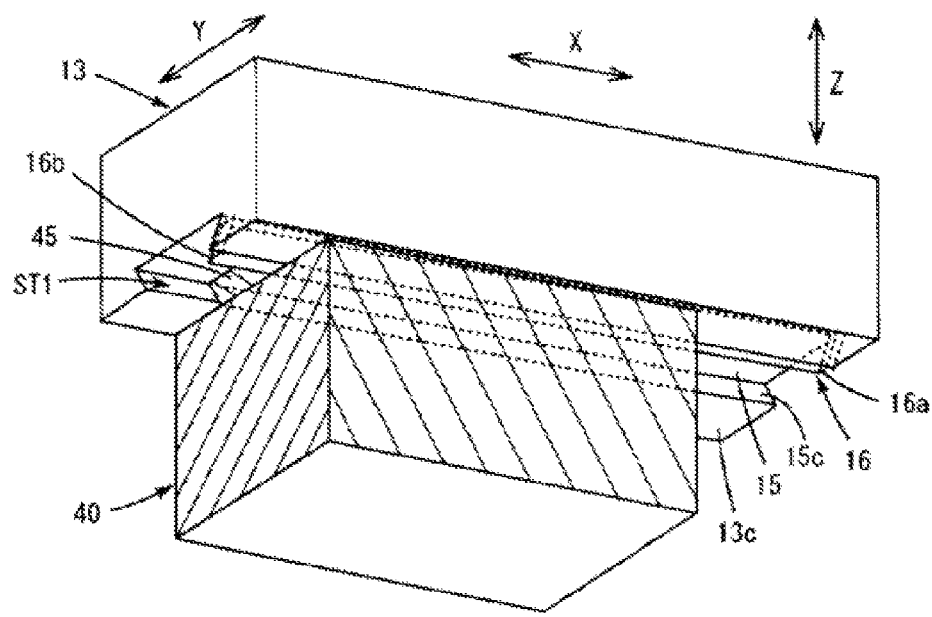
FIG. 4 is a perspective view of an engagement structure using a dovetail and a dovetail groove.

FIG. 4 schematically shows the engagement structure ST1 using the dovetail 45 and the dovetail groove 15 with a sectional view of the tool post table 40 for easier understanding. FIG. 5 schematically shows the engagement structure ST1 in a sectional view in the perpendicular direction to the X-direction. The engagement structure ST1 is a dovetail structure in which the dovetail 45 secured to the tool post table (supporting unit) 40 is slidably inserted in the dovetail groove 15 of the third tool post unit (moving unit) 13. The embodiment is different from a conventional dovetail structure in that the fitting part 947 in FIG. 9 is eliminated.

The dovetail 45 in FIG. 5 is of a trapezoid cross sectional shape widened as far from the tool post table 40 with a top 45*a* being wider (longer in the Y-direction) than a bottom 45*b* and slopes 45*c* and 45*d* being closer at the bottom 45*b* than at the top 45*a*. A through hole for the screw SC1 is formed from the top 45*a* to the bottom 45*b*. The dovetail 45 is fastened to the facing surface 40*c* of the tool post table 40 by the screw SC1 with the longitudinal direction oriented in the X-direction (facing direction). The dovetail groove 15 to which the dovetail 45 is to be slidably inserted is of a trapezoid cross sectional shape and formed on the facing surface 13*c* of the third tool post unit 13 with respect to the tool post table 40. The dovetail groove 15 is narrower at the facing surface 13*c* than at a bottom 15*a* with slopes 15*c* and 15*d* being much far at the bottom 15*a* than at the facing surface 13*c*. A long gib (gap filling member) 16 is inserted in the dovetail groove 15 to adjust the gap with respect to the dovetail 45.

The gib 16 shown in FIG. 4 is called a razor having a parallelogram cross sectional shape with thickness thereof being gradually decreased from a base 16*b* toward an end 16*b* thereof. The dovetail groove 15 is gradually decreased in width (or in interval in the Y-direction) from the side of the base 16*b* toward the side of the end 16*b*. Adjusting the X-directional position of the gib 16 with respect to the dovetail groove 15 allows a slight gap adjustment between the dovetail groove 15 and the dovetail 45.

The embodiment of the invention is advantageous in that the facing surface 13*c* of the third tool post unit 13 is a non-contact surface on the periphery 13*d* of the dovetail groove 15 when the dovetail 45 and the gib 16 are inserted in the dovetail groove 15. As shown in FIG. 5, the top 45*a* of the dovetail 45 is in contact with the bottom 15*a* of the dovetail groove 15, the slope 45*c* of the dovetail 45 is in contact with the slope 15*c* of the dovetail groove 15, the slope 45*d* of the dovetail 45 is in contact with the gib 16, and the gib 16 is in contact with the slope 15*d* of the dovetail groove 15. The contact surfaces are subject to load. The clearance CL1 is provided between the facing surface 13*c* of the third tool post unit 13 and the facing surface 40*c* of the tool post table 40. The facing surface 40*c* of the tool post table 40 is a non-contact surface. The facing surface 13*c* of the tool post unit 13 is a non-contact surface. The facing surface 13*c* of the third tool post unit 13 is not in contact with the dovetail 45 on the periphery 13*d* of the dovetail groove 15. The thickness TH1 between the back surface 40*d* of the tool post table 40 and the facing surface 13*c* of the third tool post unit 13 is therefore substantially same as the thickness of the tool post table 40 in the Z-direction only with the slight clearance CL1 provided.

(3) Operation, Function and Effect of the Machine Tool of the Embodiment

The operation of the NC lathe 1 is being described referring to the drawings. It is assumed that the workpiece W1 is machined by one of the tools T0 attached to the first tool mounting part 21 (the first tool post unit 11). The tool post body 10 is numerically controlled in the X- and Y-directions to be positioned to allow the target tool T0 to be aligned with respect to the workpiece W1. The X1-axis driving unit 51 is driven by the NC apparatus 70 to move the tool post body 10 in the X1-axis direction, thereby controlling the position of the tool post body 10 in the X-direction. The Y1-axis driving unit 53 is driven by the NC apparatus 70 to move the tool post body 10 in the Y1-axis direction, thereby controlling the position of the tool post body 10 in the Y-direction.

It is assumed that the workpiece W1 is machined by one of the tools T0 attached to the second tool mounting part 22 (the second and third tool post units 12 and 13) or to the third tool mounting part 23 (the base unit 14). Similarly, the tool post body 10 is numerically controlled in the X- and Y-directions to be positioned to allow the target tool T0 to be aligned with respect to the workpiece W1. Similarly, the X1-axis and Y1-axis driving units 51 and 53 are driven by the NC apparatus 70 to move the tool post body 10 in the X1-axis and Y-axis directions, thereby controlling the position of the tool post body 10 in the X- and Y-directions.

It is assumed that the workpiece W1 is simultaneously machined by the tools T0 attached to the first and third tool post unit 11 and 13. The tool post body 10 is numerically controlled in the X- and Y-directions to be positioned to allow the target tool T0 to be aligned with respect to the workpiece W1. The X1-axis driving unit 51 is driven by the NC apparatus 70 to move the tool post body 10 in the X1-axis direction, thereby controlling the position of the tool post body 10 in the X-direction. The Y1-axis driving unit 53 is driven by the NC apparatus 70 to move the tool post body 10 in the Y1-axis direction, thereby controlling the position of the tool post body 10 in the Y-direction. FIG. 6 shows the tool post unit body 10 in a simultaneous machining mode.

The third tool post unit 13 is numerically controlled in the X3-axis direction to be positioned to allow the target tool T0 to be aligned with respect to the workpiece W1. The relatively-driving unit 30 is driven by the NC apparatus 70 to relatively move the third tool post unit 13 in the X3-axis directions with respect to the tool post table 40, thereby controlling the position of the third tool post unit 13 in the X direction.

It is assumed that the first tool post unit 11 is moved at the velocity V1 in the X-direction and simultaneously the third tool post unit 13 is moved at the velocity V2 as shown in FIG. 7A and FIG. 7B. The first tool post unit 11 is driven in the X1-axis direction at the velocity V1. Specifically, the tool post body driving unit 50 is driven by the NC apparatus 70 to move the first tool post unit 11 in the X-direction at the velocity V1. The third tool post unit 13 is driven in the X3-axis direction at the velocity V2−V1. Specifically, the relatively-driving unit 30 is driven by the NC apparatus 70 to move the third tool post unit 13 in the X-direction at the velocity V2−V1. Such superposition control automatically cancels the velocity V1 of the first tool post unit 11 when the third tool post unit 13 is moved at the velocity V2 in the X-direction.

Figure 7C:
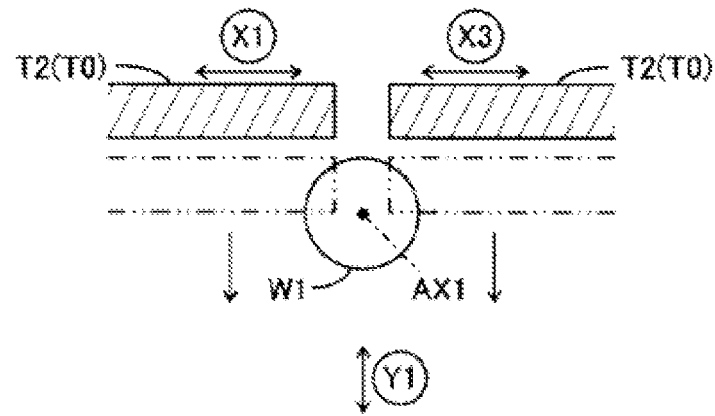

FIG. 7A, FIG. 7B and FIG. 7C schematically show an example of simultaneous machining on the workpiece W1. FIG. 7A shows an example of balance cutting by a turning tool (stationary tool T1) attached to the first tool post unit 11 and another turning tool T1 attached to the third tool post unit 13. The balance cutting is an example of simultaneous machining using a roughly cutting tool and a finely cutting tool to simultaneously cut the workpiece on the both sides thereof. The tool post body 10 may be driven by the NC apparatus 70 in the Y1-axis direction to align the target tools with the workpiece W1 in the Y-direction. The tool post body 10 may be further driven in the X1-axis direction while the third tool post unit 13 may be driven in the X3-axis direction to enable balance cutting by the cutting tools. The front spindle 81 and the guide bush 85 may be rotated on the C1-axis before the tools are brought into contact with the workpiece W1.

FIG. 7B shows an example of simultaneous drilling by a cross drill (rotary tool T2) attached to the first tool post unit 11 and another cross drill T2 attached to the third tool post unit 13. The simultaneous drilling is an example of simultaneous machining using cross drills to simultaneously form holes on the side surfaces of the workpiece. The tool post body 10 may be driven by the NC apparatus 70 in the Y1-axis direction to align the target tools with the workpiece W1 in the Y-direction. The tool post body 10 may be further driven in the X1-axis direction while the third tool post unit 13 may be driven in the X3-axis direction to enable simultaneous drilling by the cross drills. Rotation of the front spindle 81 and the guide bush 85 on the C1-axis may be stopped before the tools are brought into contact with the workpiece W1. Though not shown, tapping tools may be used to cut screw threads on the inner surfaces of the formed holes under the same control.

FIG. 7C shows an example of H cutting by an endmill (rotary tool T2) attached to the first tool post unit 11 and another endmill T2 attached to the third tool post unit 13. The H cutting is an example of simultaneous milling to parallelly cut the sides of the workpiece. The tool post body 10 may be driven by the NC apparatus 70 in the X1-axis direction while the third tool post unit 13 may be driven in the X3-axis direction to align the target tools with the workpiece W1 in the X-direction. The tool post body 10 may be further driven in the Y1-axis direction to enable H cutting by the endmills. Rotation of the front spindle 81 and the guide bush 85 on the C1-axis may be stopped before the tools are brought into contact with the workpiece W1.

During simultaneous machining, the interval L2 is narrowed in the X-direction between the first tool post unit 11 and the third tool post unit 13 while the interval L1 is kept constant between the first tool post unit 11 and the second tool post unit 12 as shown in FIG. 1 and FIG. 6. The space SP1 is thereby guaranteed between the tools T0 of the tool post units 11 and 12. Since the second tool post unit 12 is nearer to the base unit 14 than the third tool post unit 13 is, many tools T0 may be provided on the base unit 14 in the X-direction, improving tool arrangement freedom between the first tool post unit 11 and the second tool post unit 12. The lathe 1 is capable of simultaneous machining, further providing improved tool arrangement freedom.

As shown in FIG. 5, in the engagement structure ST1 for relatively driving the third tool post unit 13 with respect to the tool post table 40 in the X-direction, the dovetail 45 is not provided with the fitting part 947 of FIG. 9. The thickness TH1 between the back surface 40d of the tool post table 40 and the facing surface 13c of the third tool post unit 13 is thereby reduced in the Z-direction almost by the thickness of the fitting part 947. The lathe 1 suppresses an increase of external size, reduces uncut material, and lighten the load on the workpiece.

The technology of the invention is applicable to various embodiments. The technology is applicable to a lathe for machining a workpiece gripped by a main spindle without using a guide bush. The technology is applicable to front machining and back machining too. The technology is applicable to a machine tool of another type but the lathe. The technology is applicable to a turret or a tool post of another type but the gang tool post. The tool post body and the tool post table may be movable only in the X-direction. The tool post body driving unit may be driven in accordance with the movement of the tool post body and the tool post table. The third tool post unit may be arranged between a plurality of second tool post units. For example, a second tool post unit may be provided between the third tool post unit and the base unit and further another second tool post unit may be provided beyond the third tool post unit on the opposite side of the base unit. The second tool post unit is preferably positioned between the third tool post unit and the base unit in that many tools can be attached to the base unit. There still is, however, the basic advantage of improved tool arrangement freedom also in a machine tool where the third tool post unit is nearer to the base unit than the second tool post unit is, and even in a machine tool without the base unit.

There still is the basic advantage of improved tool arrangement freedom even without the engagement structure ST1 of the dovetail 45 and the dovetail groove 15. There is another basic advantage of suppressing an increase of external size even without the third tool post unit and the relatively-driving unit only if the engagement structure ST1 is provided.

(5) Conclusion

As described above, the invention is capable of providing a technology for improving tool arrangement freedom in a machine tool capable of simultaneous machining in various embodiments. The basic functions and effects are available even if the technology includes only the elements in the independent claim (including the embodiment) and not the elements in the dependent claims. The invention includes any replacement or exchange of the configurations disclosed in the embodiments and the modifications. The invention also includes any replacement or exchange of the prior arts and the configurations disclosed in the embodiments and the modifications.

The invention claimed is:

1. A machine tool comprising:
    a main spindle movable in a predetermined direction with a workpiece gripped thereby;
    a tool post body provided with a first tool mounting part and a second tool mounting part facing each other with the workpiece inbetween in a predetermined facing direction different from the predetermined direction, the tool post body being movable in at least the facing direction; and
    a tool post body driving unit configured to move the tool post body in at least the facing direction, wherein the tool post body comprising:
    a first tool post unit provided with the first tool mounting part;
    a second tool post unit provided with a portion of the second tool mounting part with a relative interval with respect to the first tool post unit in the facing direction kept constant;
    a third tool post unit provided with the remaining portion of the second tool mounting part with a relative interval with respect to the first tool post unit in the facing direction kept variable; and
    a relatively-driving unit configured to relatively move the third tool post unit in the facing direction with respect to the first tool post unit.

2. The machine tool of claim 1, wherein the first tool mounting part has a tool arranged in a tool arrangement direction different from the facing direction;
    the tool post body comprises a base unit configured to connect an end of the first tool post unit and an end of the second tool post unit in the tool arrangement direction; and
    the third tool post unit is separated from the base unit in the tool arrangement direction with the second tool post unit inbetween.

3. The machine tool of claim 2, wherein the base unit comprises a third tool mounting part on the side the first tool post unit and the second tool post unit are provided.

4. The machine tool of claim 1, wherein the tool post body is provided on a tool post table movable in at least the facing direction;
    a dovetail is secured to the tool post table, the dovetail being of a trapezoid cross sectional shape widened as far from the tool post table with its longitudinal direction oriented along the facing direction;
    a dovetail groove is formed on a facing surface of the third tool post unit with respect to the tool post table, to which the dovetail groove being slidably inserted; and
    the facing surface is a non-contact surface on the periphery of the dovetail groove.

5. The machine tool of claim 2, wherein the tool post body is provided on a tool post table movable in at least the facing direction;
    a dovetail is secured to the tool post table, the dovetail being of a trapezoid cross sectional shape widened as far from the tool post table with its longitudinal direction oriented along the facing direction;
    a dovetail groove is formed on a facing surface of the third tool post unit with respect to the tool post table, to which the dovetail groove being slidably inserted; and
    the facing surface is a non-contact surface on the periphery of the dovetail groove.

6. The machine tool of claim 3, wherein the tool post body is provided on a tool post table movable in at least the facing direction;
    a dovetail is secured to the tool post table, the dovetail being of a trapezoid cross sectional shape widened as far from the tool post table with its longitudinal direction oriented along the facing direction;
    a dovetail groove is formed on a facing surface of the third tool post unit with respect to the tool post table, to which the dovetail groove being slidably inserted; and
    the facing surface is a non-contact surface on the periphery of the dovetail groove.

7. The machine tool of claim 1 further comprising a control unit for the tool post driving unit and the relatively-driving unit; wherein,
the control unit controls the tool post driving unit to move the first tool post unit at a velocity V1 in the facing direction and controls the relatively-driving unit to move the third tool post unit at a velocity V2−V1 in the facing direction to simultaneously move the first tool post unit at the velocity V1 and the third tool post unit at a velocity V2 in the facing direction.

8. The machine tool of claim 2 further comprising a control unit for the tool post driving unit and the relatively-driving unit; wherein,
the control unit controls the tool post driving unit to move the first tool post unit at a velocity V1 in the facing direction and controls the relatively-driving unit to move the third tool post unit at a velocity V2−V1 in the facing direction to simultaneously move the first tool post unit at the velocity V1 and the third tool post unit at a velocity V2 in the facing direction.

9. The machine tool of claim 3 further comprising a control unit for the tool post driving unit and the relatively-driving unit; wherein,
the control unit controls the tool post driving unit to move the first tool post unit at a velocity V1 in the facing direction and controls the relatively-driving unit to move the third tool post unit at a velocity V2−V1 in the facing direction to simultaneously move the first tool post unit at the velocity V1 and the third tool post unit at a velocity V2 in the facing direction.

10. The machine tool of claim 4 further comprising a control unit for the tool post driving unit and the relatively-driving unit; wherein,
the control unit controls the tool post driving unit to move the first tool post unit at a velocity V1 in the facing direction and controls the relatively-driving unit to move the third tool post unit at a velocity V2−V1 in the facing direction to simultaneously move the first tool post unit at the velocity V1 and the third tool post unit at a velocity V2 in the facing direction.

11. The machine tool of claim 5 further comprising a control unit for the tool post driving unit and the relatively-driving unit; wherein,
the control unit controls the tool post driving unit to move the first tool post unit at a velocity V1 in the facing direction and controls the relatively-driving unit to move the third tool post unit at a velocity V2−V1 in the facing direction to simultaneously move the first tool post unit at the velocity V1 and the third tool post unit at a velocity V2 in the facing direction.

12. The machine tool of claim 6 further comprising a control unit for the tool post driving unit and the relatively-driving unit; wherein,
the control unit controls the tool post driving unit to move the first tool post unit at a velocity V1 in the facing direction and controls the relatively-driving unit to move the third tool post unit at a velocity V2−V1 in the facing direction to simultaneously move the first tool post unit at the velocity V1 and the third tool post unit at a velocity V2 in the facing direction.

\* \* \* \* \*